(12) United States Patent
Li et al.

(10) Patent No.: US 12,710,529 B2
(45) Date of Patent: Aug. 18, 2026

(54) METHODS AND SYSTEMS FOR DETERMINISTIC CALCULATION OF SURFACE NORMAL VECTORS FOR SPARSE POINT CLOUDS

(71) Applicants: Thomas Enxu Li, Mississauga (CA); Ryan Razani, Toronto (CA); Yuan Ren, Thornhill (CA); Bingbing Liu, Beijing (CN)

(72) Inventors: Thomas Enxu Li, Mississauga (CA); Ryan Razani, Toronto (CA); Yuan Ren, Thornhill (CA); Bingbing Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1017 days.

(21) Appl. No.: 17/903,698

(22) Filed: Sep. 6, 2022

(65) Prior Publication Data

US 2023/0075409 A1 Mar. 9, 2023

Related U.S. Application Data

(60) Provisional application No. 63/242,000, filed on Sep. 8, 2021.

(51) Int. Cl.
*G01S 13/89* (2006.01)
*G01S 13/931* (2020.01)

(52) U.S. Cl.
CPC ............ *G01S 13/89* (2013.01); *G01S 13/931* (2013.01); *G06T 2207/10028* (2013.01)

(58) Field of Classification Search
CPC .................. G01S 13/89; G01S 13/931; G01S 2013/9323; G06T 2207/10028
See application file for complete search history.

(56) References Cited

U.S. PATENT DOCUMENTS

2019/0279339 A1* 9/2019 Castorena Martinez .................... G01S 7/4808

OTHER PUBLICATIONS

Badino H et al., Fast and Accurate Computation of Surface Normals from Range Images, 2011, IEEE (Year: 2011).*
Yang S et al., Fine edge-preserving technique for display devices, 2008, IEEE (Year: 2008).*
Wu B et al., SqueezeSeg: Convolutional Neural Nets with Recurrent CRF for Real-Time Road-Object Segmentation from 3D LiDAR Point Cloud, 2017 (Year: 2017).*

(Continued)

*Primary Examiner* — Sumati Lefkowitz
*Assistant Examiner* — Anthony J Rodriguez

(57) ABSTRACT

Methods and systems for computing a surface normal vector for a point cloud are disclosed. A sparse range map is generated by projecting the point cloud. A vertical kernel and a horizontal kernel are used to generate a vertical kernel range map and a horizontal kernel range map from the sparse range map. To complete an empty entry in the sparse range map, a guidance range map is used compute a vertical gradient and a horizontal gradient. The empty entry is filled using a corresponding entry in the vertical kernel range map or in the horizontal kernel range map, based on a comparison between the vertical gradient and the horizontal gradient. A surface normal vector is computed using the completed dense range map.

20 Claims, 6 Drawing Sheets

(56) References Cited

OTHER PUBLICATIONS

Dax A, Imputing Missing Entries of a Data Matrix: A Review, 2014, Columbia International Publishing (Year: 2014).*
Lim H et al., Low-Resolution LiDAR Upsampling Using Weighted Median Filter, 2021, Springer (Year: 2021).*
Takeda H et al., Kernel Regression for Image Processing and Reconstruction, 2007, IEEE (Year: 2007).*
Zhou et al., "Open3d: A modern library for 3d data processing". arXiv preprint arXiv:1801.09847.
Cheng et al., "(AF)2-S3Net: Attentive Feature Fusion with Adaptive Feature Selection for Sparse Semantic Segmentation Network", arXiv preprint arXiv: 2102.04530, 2021.
Fu et al. , "EFANNA : An Extremely Fast Approximate Nearest Neighbor Search Algorithm Based on kNN Graph", arXiv preprint arXiv:1609.07228, 2016.
Klasing et al., "Comparison of surface normal estimation methods for range sensing applications". In Conference on Robotics and Automation, pp. 1977-1982, 2009.
Ku et al., "In Defense of Classical Image Processing: Fast Depth Completion on the CPU," 2018 15th Conference on Computer and Robot Vision (CRV), 2018, pp. 16-22, doi: 10.1109/CRV.2018.00013.
Li et al., "Neural Gradient Learning and Optimization for Oriented Point Normal Estimation", SA Conference Papers, Dec. 12-15, 2023.
Miao et al., "3D Object Detection with Normal-map on Point Clouds", VISAPP 2021—16th International Conference on Computer Vision Theory and Applications.
Mitra et al., "Estimating surface normal in noisy point cloud data". International Journal of Computational Geometry & Applications, 14(4 & 5):261-276, 2004.
Pathak et al., "Uncertainty analysis for optimum plane extraction from noisy 3D range-sensor point-clouds". Intelligent Service Robotics, 3(1):37-48, 2009.
Xu et al., "Depth Completion From Sparse LiDAR Data With Depth-Normal Constraints," 2019 IEEE/CVF International Conference on Computer Vision (ICCV), 2019, pp. 2811-2820, doi: 10.1109/ICCV.2019.00290.
Zhou et al., "Geometry and Learning Co-supported Normal Estimation for Unstructured Point Cloud", Proceedings of the IEEE/CVF Conference on Computer Vision and Pattern Recognition (CVPR), 2020, pp. 13238-13247.
Zhou et al., "Normal estimation for 3d point clouds via local plane constraint and multi-scale selection". arXiv preprint arXiv:1910.08537, 2019.

* cited by examiner

METHODS AND SYSTEMS FOR DETERMINISTIC CALCULATION OF SURFACE NORMAL VECTORS FOR SPARSE POINT CLOUDS

CROSS-REFERENCE TO RELATED APPLICATIONS

This disclosure claims priority from U.S. provisional patent application No. 63/242,000, filed Sep. 8, 2021, entitled “METHODS AND SYSTEMS FOR DETERMINISTIC CALCULATION OF SURFACE NORMAL VECTORS FOR SPARSE POINT CLOUDS”, the entirety of which is hereby incorporated by reference.

FIELD

The present disclosure relates to servers, methods and systems for processing sparse point clouds, including for processing sparse point clouds to compute a surface normal vector.

BACKGROUND

Reliable estimation of the surface normal vectors of point clouds (otherwise referred to as normal estimation) is an important preprocessing operation required by many point cloud processing algorithms. Many existing point cloud processing algorithms benefit from having an accurate surface normal vector computed and associated with each point of the point cloud. For example, many surface reconstruction algorithms require accurate surface normal vectors as input in order to generate high-quality surfaces. Normal estimation is also widely used in point cloud processing algorithms, such as segmentation, smoothing, simplification, shape modeling, and feature extraction.

In many robotic or autonomous vehicle applications, a light detection and ranging (LIDAR) sensor is used to generate point clouds based on scans of a surrounding environment. LIDAR point clouds are typically more dense on the scan line (i.e., having higher density of data points along a horizontal direction) than that in the vertical direction. Moreover, the distribution of the data points in the point cloud generated by a LIDAR sensor is not uniform. Data points are denser in in the region closer to the LIDAR sensor and sparser further out. Thus, LIDAR point clouds are typically sparse and non-uniform. A similar sparsity and non-uniformity may be found in other types of point clouds, such as point clouds generated by any type of detection and ranging (DAR) sensor (e.g., radar sensor). However, most existing techniques for normal estimation are designed for dense point clouds and may result in unacceptable loss of detail when applied to sparse point clouds.

Further, in robotics and automotive applications, real-time performance is an important consideration. Many existing normal estimation techniques require complex computations which may be difficult or impossible to be performed using practical computing systems in real-time.

It is therefore desirable to provide methods and systems for estimating the surface normal vectors of sparse point clouds, such as LIDAR point clouds.

SUMMARY

In various examples, the present disclosure describes methods and systems for computing surface normal vectors for a point cloud. The disclosed examples may enable surface normal vectors to be computed within having to perform complex computations such as those required in machine learning-based approaches. Rather, a deterministic approach is used, using a depth-completed range map. Further, the disclosed examples do not require the point cloud to be a dense point cloud. This provides a technical advantage that surface normal vectors can be computed from sparse point clouds, in real-time or near real-time, which may assist in improving the performance of downstream perception tasks.

In examples disclosed herein, a 3D point cloud is projected to a 2D sparse range map. A depth completion process is used to complete the sparse range map to obtain a dense range map. The depth completion involves aggregating neighborhood information using different kernels. Gradients computed using a guidance range map are used to perform the depth completion. In this way, depth completion may be performed in a deterministic manner, without requiring the complex computations needed for implementing neural networks.

In an example aspect, the present disclosure describes a computing system including a processing unit configured to execute instructions to cause the computing system to: receive a point cloud; project the point cloud to a sparse range map; generate, from the sparse range map, a vertical kernel range map using a vertical kernel and a horizontal kernel range map using a horizontal kernel; obtain a guidance range map that is a smoothed approximation of the sparse range map; complete the sparse range map to obtain a dense range map by: for a given empty entry in the sparse range map, computing a vertical gradient and a horizontal gradient for a corresponding entry in the guidance range map; and filling in the given empty entry using a corresponding entry in the vertical kernel range map or in the horizontal kernel range map, based on a comparison between the vertical gradient and the horizontal gradient. The processing unit is further configured to execute instructions to cause the computing system to: compute a surface normal vector using the dense range map; and output the point cloud associated with the surface normal vector.

In an example of the preceding aspect of the system, the processing unit may be further configured to execute instructions to cause the computing system to generate the vertical kernel range map by: for at least one entry in the sparse range map, define a set of vertical neighbors using a vertical kernel; compute a vertical kernel-based aggregate value from the set of vertical neighbors; and store the vertical kernel-based aggregate value as a corresponding entry in the vertical kernel range map. The processing unit may be further configured to execute instructions to cause the computing system to generate the horizontal kernel range map by: for at least one entry in the sparse range map, define a set of horizontal neighbors using a horizontal kernel; compute a horizontal kernel-based aggregate value from the set of horizontal neighbors; and store the horizontal kernel-based aggregate value as a corresponding entry in the horizontal kernel range map.

In an example of the preceding aspect of the system, the vertical kernel range map may be generated to have entries corresponding to every entry in the sparse range map, and the horizontal kernel range map may be generated to have entries corresponding to every entry in the sparse range map.

In an example of a preceding aspect of the system, the vertical kernel range map may be generated to have entries corresponding to empty entries in the sparse range map, and the horizontal kernel range map may be generated to have entries corresponding to empty entries in the sparse range map.

In an example of any of the preceding aspects of the system, the processing unit may be further configured to execute instructions to cause the computing system to obtain the guidance range map by: projecting the point cloud to a smaller sized range map having dimensions smaller than the sparse range map; and upsampling the smaller sized range map to obtain the guidance range map having dimensions equal to the sparse range map.

In an example of any of the preceding aspects of the system, the processing unit may be further configured to execute instructions to cause the computing system to obtain the guidance range map by: selecting at least one of the vertical kernel range map or the horizontal kernel range map to use as the guidance range map.

In an example of any of the preceding aspects of the system, filling in the given empty entry using a corresponding entry in the vertical kernel range map or in the horizontal kernel range map may include: selecting the corresponding entry in the vertical kernel range map when the horizontal gradient is greater than the vertical gradient; and selecting the corresponding entry in the horizontal kernel range map when the vertical gradient is greater than the horizontal gradient.

In an example of any of the preceding aspects of the system, the processing unit may be further configured to execute instructions to cause the computing system to output the dense range map.

In an example of any of the preceding aspects of the system, the processing unit may be further configured to execute instructions to cause the computing system to: prior to computing the surface normal vector, perform at least one of dilation or median blur on the dense range map; and the surface normal vector may be computed from the dense range map after the at least one of the dilation or median blur.

In an example of any of the preceding aspects of the system, the computing system may be implemented in an autonomous vehicle.

In another example aspect, the present disclosure describes a method including: receiving a point cloud; projecting the point cloud to a sparse range map; generating, from the sparse range map, a vertical kernel range map using a vertical kernel and a horizontal kernel range map using a horizontal kernel; obtaining a guidance range map that is a smoothed approximation of the sparse range map; completing the sparse range map to obtain a dense range map by: for a given empty entry in the sparse range map, computing a vertical gradient and a horizontal gradient for a corresponding entry in the guidance range map; and filling in the given empty entry using a corresponding entry in the vertical kernel range map or in the horizontal kernel range map, based on a comparison between the vertical gradient and the horizontal gradient. The method also includes: computing a surface normal vector using the dense range map; and outputting the point cloud associated with the surface normal vector.

In an example of the preceding aspect of the method, generating the vertical kernel range map may include: for at least one entry in the sparse range map, defining a set of vertical neighbors using a vertical kernel; computing a vertical kernel-based aggregate value from the set of vertical neighbors; and storing the vertical kernel-based aggregate value as a corresponding entry in the vertical kernel range map. Generating the horizontal kernel range map may include: for at least one entry in the sparse range map, defining a set of horizontal neighbors using a horizontal kernel; computing a horizontal kernel-based aggregate value from the set of horizontal neighbors; and storing the horizontal kernel-based aggregate value as a corresponding entry in the horizontal kernel range map.

In an example of the preceding aspect of the method, the vertical kernel range map may be generated to have entries corresponding to every entry in the sparse range map, and the horizontal kernel range map may be generated to have entries corresponding to every entry in the sparse range map.

In an example of a preceding aspect of the method, the vertical kernel range map may be generated to have entries corresponding to empty entries in the sparse range map, and the horizontal kernel range map may be generated to have entries corresponding to empty entries in the sparse range map.

In an example of any of the preceding aspects of the method, obtaining the guidance range map may include: projecting the point cloud to a smaller sized range map having dimensions smaller than the sparse range map; and upsampling the smaller sized range map to obtain the guidance range map having dimensions equal to the sparse range map.

In an example of any of the preceding aspects of the method, obtaining the guidance range map may include: selecting at least one of the vertical kernel range map or the horizontal kernel range map to use as the guidance range map.

In an example of any of the preceding aspects of the method, filling in the given empty entry using a corresponding entry in the vertical kernel range map or in the horizontal kernel range map may include: selecting the corresponding entry in the vertical kernel range map when the horizontal gradient is greater than the vertical gradient; and selecting the corresponding entry in the horizontal kernel range map when the vertical gradient is greater than the horizontal gradient.

In an example of any of the preceding aspects of the method, the method may include outputting the dense range map.

In an example of any of the preceding aspects of the method, the method may include: prior to computing the surface normal vector, performing at least one of dilation or median blur on the dense range map; and the surface normal vector may be computed from the dense range map after the at least one of the dilation or median blur.

In another example aspect, the present disclosure describes a non-transitory computer readable medium having instructions encoded thereon, wherein the instructions are executable by a processing unit of a computing system to cause the computing system to: receive a point cloud; project the point cloud to a sparse range map; generate, from the sparse range map, a vertical kernel range map using a vertical kernel and a horizontal kernel range map using a horizontal kernel; obtain a guidance range map that is a smoothed approximation of the sparse range map; complete the sparse range map to obtain a dense range map by: for a given empty entry in the sparse range map, computing a vertical gradient and a horizontal gradient for a corresponding entry in the guidance range map; and filling in the given empty entry using a corresponding entry in the vertical kernel range map or in the horizontal kernel range map, based on a comparison between the vertical gradient and the horizontal gradient. The instructions are further executable to cause the computing system to: compute a surface normal vector using the dense range map; and output the point cloud associated with the surface normal vector.

In some examples of the preceding aspect of the computer readable medium, the instructions may be further executable to cause the computing system to perform any of the preceding aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

The present disclosure describes example methods and systems for deterministic calculation of surface normal vectors for a point cloud, in particular a sparse point cloud. Examples of the present disclosure may enable real-time (or near real-time) estimation of surface normal vectors, which may be useful for improving the perception capability of autonomous or semi-autonomous vehicles, mobile robots, and other devices that rely on a detection and ranging (DAR) sensor (e.g., light detection and ranging (LIDAR) sensor, radar sensor, etc.) to scan the surrounding environment.

Some examples of the present disclosure are described in the context of autonomous vehicles and mobile robots. However, the methods and systems disclosed herein may also be suitable for implementation outside of autonomous vehicles and mobile robots, and may be implemented in any suitable computing system. Examples of the present disclosure may be suitable for estimation of surface normal vectors in real-time (or near real-time), and may also be suitable for applications that do not require real-time processing of point clouds. Further, examples of the present disclosure may be suitable for processing point clouds generated by any sensor, without being limited to sparse point clouds.

Although examples described herein may refer to a car as the autonomous vehicle, the teachings of the present disclosure may be relevant to other forms of autonomous or semi-autonomous devices including, for example, trams, subways, trucks, buses, surface and submersible watercraft and ships, aircraft, drones (also called unmanned aerial vehicles (UAVs)), warehouse equipment, construction equipment or farm equipment and may include vehicles that do not carry passengers as well as vehicles that do carry passengers. The methods and systems disclosed herein may also be relevant to non-vehicular devices, for example autonomous vacuum cleaners and lawn mowers, and any mobile robot. Further, although examples described herein may refer to sensors such as LIDAR and radar sensors, it should be understood that the teachings of the present disclosure may be relevant to other forms of DAR sensors, include ray-scanning sensors that may be found in the above-noted autonomous or semi-autonomous devices.

Figure 1:
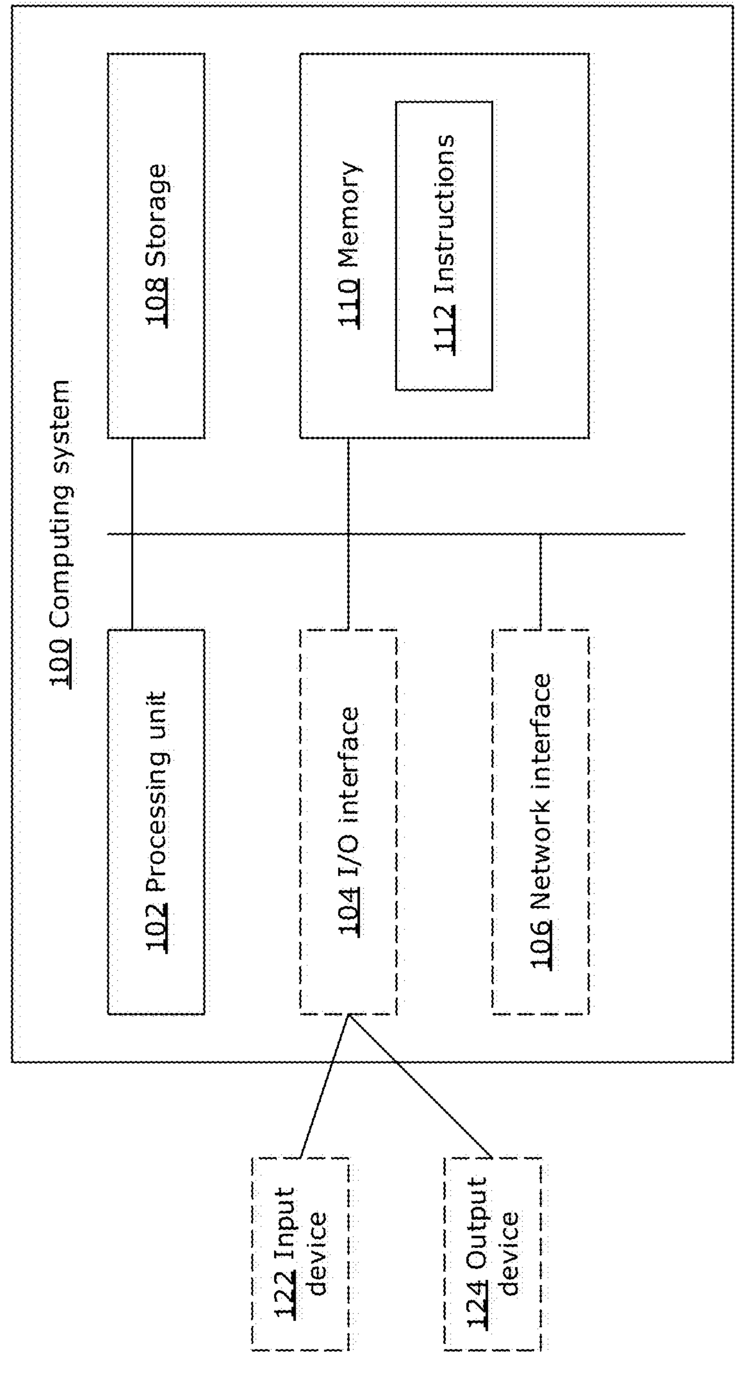
FIG. 1 is a block diagram illustrating an example computing system, in which examples of the present disclosure may be implemented.

FIG. 1 is a block diagram illustrating a simplified example of a computing system 100, such as a server, a computer or a cloud computing platform, suitable for carrying out examples described herein. For example, the computing system 100 may carry out computations and other operations to estimate a surface normal vector for a point cloud. Although FIG. 1 shows a single instance of each component, there may be multiple instances of each component in the computing system 100. Other examples suitable for implementing embodiments described in the present disclosure may be used, which may include components different from those discussed below. For example, FIG. 2 (described further below) illustrates an example autonomous vehicle, in which examples of the present disclosure may be implemented.

The computing system 100 may include at least one processing unit 102, which may include one or more hardware devices, such as a processor, a microprocessor, a digital signal processor, an ASIC, a FPGA, a dedicated logic circuitry, or combinations thereof. The computing system 100 may also include an optional input/output (I/O) interface 104, which may enable interfacing with one or more optional input devices 122 and/or optional output devices 124.

In the example shown, the input device(s) 122 (e.g., a keyboard, a mouse, a microphone, a touchscreen, and/or a keypad) and output device(s) 124 (e.g., a display, a speaker and/or a printer) are shown as optional and external to the computing system 100. In other examples, there may not be any input device(s) 122 and output device(s) 124, in which case the I/O interface 104 may not be needed.

The computing system 100 may include an optional network interface 106 for wired or wireless communication with one or more other devices or systems over a communication network. The network interface 106 may include wired links (e.g., Ethernet cable) and/or wireless links (e.g., one or more antennas) for intra-network and/or inter-network communications.

The computing system 100 may also include at least one storage unit 108, which may include a mass storage unit such as a solid state drive, a hard disk drive, a magnetic disk drive and/or an optical disk drive.

The computing system 100 may include at least one memory 110, which may include a volatile or non-volatile memory (e.g., a flash memory, a RAM and/or a ROM). The non-transitory memory 110 may store instructions 112 for execution by the processing unit 102, such as to carry out examples described in the present disclosure. In some examples, the memory 110 may include software instructions 112 for execution by the processing unit 102 to implement a method for calculation surface normal vectors for data points of a point cloud as disclosed herein. The software instructions 112 may also include other instructions, such as for implementing an operating system and other applications/functions.

The non-transitory memory 110 may also store instructions 112 for further processing of the point cloud. For example, the point cloud together with computed surface normal vectors may be further processed as input to perform an inference task, such as an object detection or navigation task.

In some examples, the computing system 100 may additionally or alternatively execute instructions from an external memory (e.g., an external drive in wired or wireless communication with the computing system 100) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Examples of the present disclosure may be implemented onboard an autonomous vehicle or mobile robot, for example to enable real-time or near real-time computation of surface normal vectors from a point cloud generated by an onboard DAR sensor.

Figure 2:
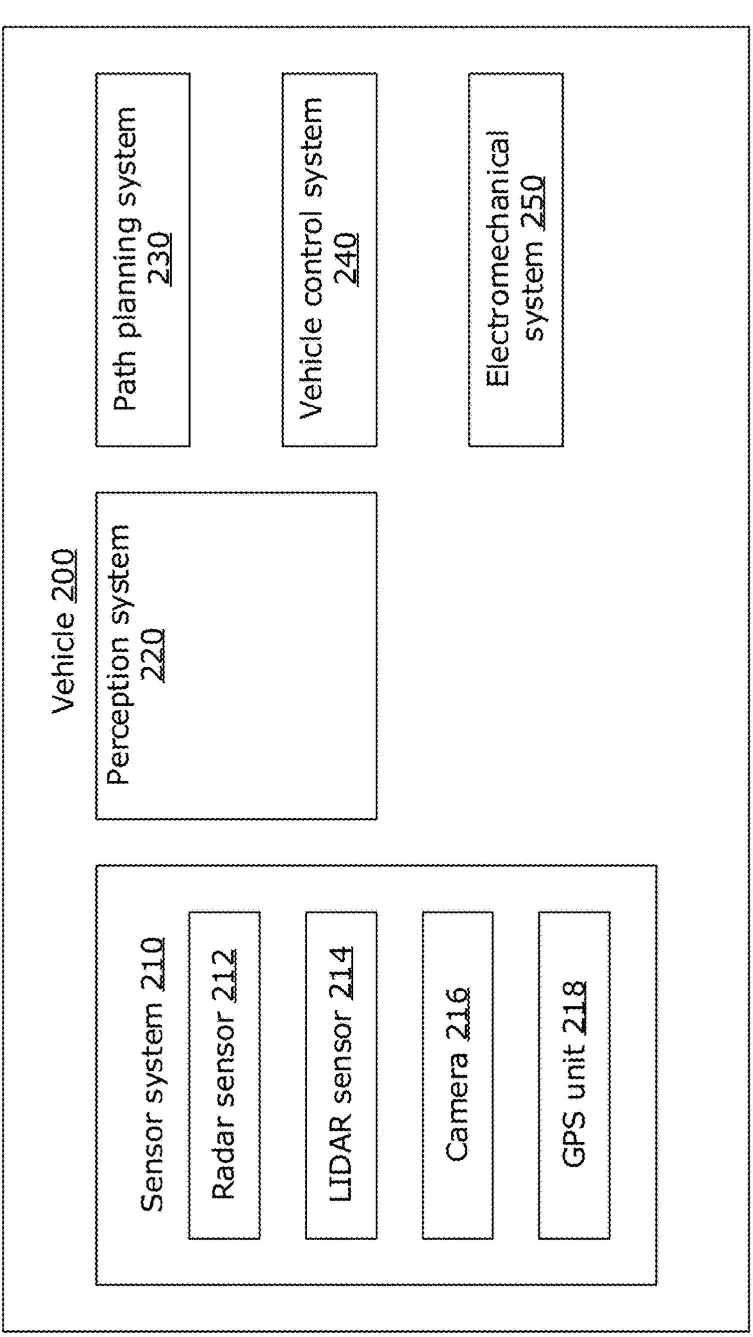
FIG. 2 is a block diagram illustrating an example autonomous vehicle, in which examples of the present disclosure may be implemented.

FIG. 2 is a block diagram illustrating certain components of an example autonomous vehicle 200. Although described as being autonomous, the vehicle 200 may be operable in a fully-autonomous, semi-autonomous or fully user-controlled mode. In the present disclosure, the vehicle 200 is described in the embodiment of a car; however the present disclosure may be implemented in other vehicular or non-vehicular machines, as discussed above.

The vehicle 200 includes a sensor system 210, a perception system 220, a path planning system 230, a vehicle control system 240 and an electromechanical system 250, for example. Other systems and components may be included in the vehicle 200 as appropriate. Various systems and components of the vehicle may communicate with each other, for example through wired or wireless communication. For example, the sensor system 210 may communicate with the perception system 220, path planning system 230 and the vehicle control system 240; the perception system 220 may communicate with the path planning system 230 and the vehicle control system 240; the path planning system 230 may communicate with the vehicle control system 240; and the vehicle control system 240 may communicate with the mechanical system 250. Although not shown in FIG. 2, the vehicle 200 may include the computing system 100 of FIG. 1. For example, some operations of the perception system 220 (e.g., preprocessing of a point cloud), path planning system 230 and/or vehicle control system 240 may be implemented by the processing unit 102 executing instructions 112 stored in the memory 110.

The sensor system 210 includes various sensing units for collecting information about the internal and/or external environment of the vehicle 200. In the example shown, the sensor system 210 includes a radar sensor 212, a LIDAR sensor 214, a camera 216 and a global positioning system (GPS) unit 218. The sensor system 210 may include other sensing units, such as a temperature sensor, precipitation sensor or microphone, among other possibilities.

In some examples, there may be one or more radar sensors 212 that may capture data in a wide view (e.g., 360° view) about the vehicle 200. The radar data (e.g., the raw sensor data acquired by the radar sensor(s) 212) may represent three-dimensional (3D) information about the environment, and may be processed to form a set of data points in 3D space (referred to hereinafter as a point cloud), where each data point in the point cloud represents the 3D coordinates (e.g., x, y and z values) of an object sensed by the one or more radar sensors 212 in 3D space.

In some examples, there may be one or more LIDAR sensors 214 that may capture data in a wide view (e.g., 360° view) about the vehicle 200. The LIDAR data (e.g., the raw sensor data acquired by the LiDAR sensor(s) 214) may also represent 3D information about the environment, and may also be processed to form a point cloud, where each data point in the point cloud represents the 3D coordinates (e.g., x, y and z values) of an object sensed by the one or more LIDAR sensors 214 in 3D space.

In general, the data points in a point cloud (e.g., generated by the radar sensor 212 or the LIDAR sensor 214) may be irregularly spaced, depending on the sensed environment. In some examples, in addition to 3D coordinates, each data point in the point cloud may also contain other information, such as intensity of the data points (e.g., the intensity of the reflected electromagnetic wave in the case of a radar point cloud, or the intensity of the reflected light in the case of a LIDAR point cloud) or time of detection of the data point. The present disclosure is not limited any specific type of point cloud generated by any specific type of sensor, and may be suitable for processing point clouds in general.

Using the various sensors 212, 214, 216, 218, the sensor system 210 may collect information about the local environment of the vehicle 200 (e.g., any immediately surrounding obstacles) as well as information from a wider vicinity (e.g., the radar sensor 212 and LIDAR sensor 214 may collect information from an area of up to 100 m radius or more around the vehicle 200). The sensor system 210 may also collect information about the position and orientation of the vehicle 200 relative to a frame of reference (e.g., using the GPS unit 218).

The sensor system 210 communicates with the perception system 220 to provide point clouds to the perception system 220. The input to the perception system 220 may include the data points of a point cloud received from the sensor system 210. The perception system 220 may process the point clouds (e.g., to perform preprocessing, feature extraction and/or inference tasks such as object classification, regression, segmentation, etc.). The perception system 220 may be implemented using software, which may include any number of independent or interconnected modules or functions, for example including machine learning algorithms and image processing functions. The perception system 220 may be implemented using an embodiment of the computing system 100 of FIG. 1, for example. The perception system 220 may repeatedly (e.g., in regular intervals, such as every 100 ms) receive point clouds from the sensor system 210, and process the point clouds in real-time or near real-time.

The perception system 220 may provide inference outputs (e.g., object labels, object classes, etc.) to the path planning system 230. The path planning system 230 generates target objectives for the vehicle (e.g., planned paths for the vehicle) and provide the target objectives to the vehicle controls system 240. The vehicle control system 240 serves to control operation of the vehicle 200 based on target objectives received from the path planning system 230. The vehicle control system 240 may be used to provide full, partial or assistive control of the vehicle 200. The electromechanical system 250 receives control signals from the vehicle control system 240 to operate the mechanical and/or electromechanical components of the vehicle 200 such as an engine, transmission, steering system and braking system.

It will be appreciated that various components and operations described herein can be implemented on multiple separate devices or systems in some embodiments.

To assist in understanding the present disclosure, some existing techniques for computing surface normal vectors are first discussed.

It is known that the perception capability of autonomous vehicles can be improved by suitable real-time preprocessing of sensor data, such as preprocessing of point clouds generated by a LIDAR sensor. For example, Miao et al. ("3D Object Detection with Normal-map on Point Clouds", *VISAPP 2021—16th International Conference on Computer Vision Theory and Applications*) describes using the Open3D library (e.g., as described by Zhou et al. in "Open3d: A modern library for 3d data processing", arXiv preprint arXiv:1801.09847, 2018) to compute the surface normal vectors of a point cloud received from a LIDAR sensor to help improve the performance of the point cloud processing algorithm for a perception task, such as 3D object detection. In another example, Cheng et al. ("(AF)2-S3Net: Attentive Feature Fusion with Adaptive Feature Selection for Sparse Semantic Segmentation Network", arXiv preprint arXiv: 2102.04530, 2021) describes using the surface normal vectors in the semantic segmentation of a point cloud.

The estimation of the surface normal vectors of a point cloud has been studied in computer graphics, image processing, and mathematics. Geometry-based methods for estimation of the surface normal of a point cloud typically involve two main operation: (1) a nearest neighbor search; and (2) estimating the surface normal vectors with a current point and its nearest neighbors. However, 3D data points in a point cloud are usually unstructured and unorganized (e.g., the data points are not indexed by row and column), meaning it is not trivial to find the nearest neighbors to a given data point. The k-Nearest Neighbor (KNN) algorithm and its modifications are typically used to extract points in a small region of the point cloud for further analysis, however performing a nearest neighbors search can be slow. For example, the number of data points in a point cloud generated by a typical LIDAR sensor can be quite large (e.g., ~120,000 points per 0.1 s for a 64-beam spinning scan LIDAR sensor), which may result in the nearest neighbor search being a bottleneck that prevents real-time estimation of surface normal vectors of a point cloud.

Figures 3A, 3B, 3C:
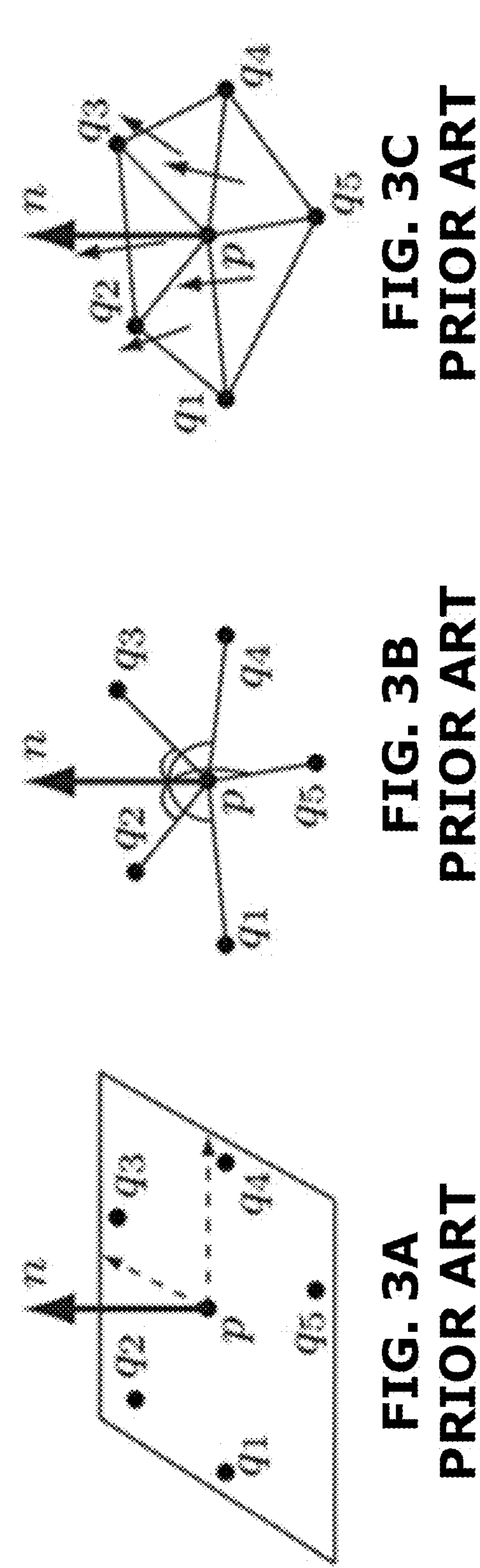
FIGS. 3A-3C illustrate some existing techniques for estimation of a surface normal vector.

Other methods for estimating the surface normal vectors of a point cloud include optimization-based methods and averaging methods, some of which as illustrated in FIGS. 3A-3C.

FIG. 3A illustrates an example of an optimization-based method to fit a plane to a given point (denoted p) of a point cloud and the given point's k nearest neighbors (denoted $q_1$ to $q_5$) by using a least square method. To adapt to the shape of the surface, some higher order algebraic surfaces such as spheres and quadrics may be used in place of a planar surface. Generally, the average distance from the points to the fitting plane or surface is a cost function which needs to be minimized. After a plane or surface has been fitted, the normal (denoted n) may be calculated by geometry techniques.

Another approach, an example of which is illustrated in FIG. 3B, is to maximize the angle (or minimize the inner product) between the tangential vectors between the given point p and its neighbors $q_1$ to $q_5$, and the surface normal vectors.

FIG. 3C illustrates an example of an averaging method. The averaging method estimates the surface normal vectors of the given point p by calculating a weighted average of the normal vectors of the triangles which are constructed between the point p and its neighbors $q_1$ to $q_5$. The weighting factors may be determined by different methods, such an area-based weighting method which uses the area of each triangle as the weight of the normal, or an angle-based weighting method which uses the included angle between $q_i$-p and $q_{i+1}$-p as the weight of each triangle's surface normal vector.

However, optimization-based methods and averaging methods are typically designed for dense and uniform point clouds. As mentioned previously, a point cloud generated by a typical spinning scan sensor (e.g., LIDAR point cloud) tends to be more dense along the scan line (also referred to as the horizontal direction) than in the vertical direction. Moreover, the distribution of the data points in the point cloud generated by such a sensor typically is not uniform (e.g., tends to be denser for points closer to the sensor and sparse for points further from the sensor). This sparsity and non-uniformity of the point cloud means that the result of estimation of a surface normal vector can be sensitive to the size of the neighborhood (i.e., a point on the point cloud and its nearby points) for a point in the point cloud. If the neighborhood only contains a single scan line or does not include enough data points, the surface normal estimation may not be accurate. Another drawback of optimization-based methods and averaging methods is that they tend to smooth out details of a surface resulting in loss of information, particularly if the neighborhood size is large.

Machine learning-base methods have been also been investigated for estimating the surface normal vectors of a point cloud. For example, Zhou et al. (*Proceedings of the IEEE/CVF Conference on Computer Vision and Pattern Recognition* (*CVPR*), 2020, pp. 13238-13247) describes a machine learning-based method to predict the suboptimal k-nearest neighboring size based on the surface structure of the point cloud. In another example, Zhou et al. ("Normal estimation for 3d point clouds via local plane constraint and multi-scale selection", arXiv preprint arXiv:1910.08537, 2019) describes using a PointNet architecture to estimate the surface normal vectors of point cloud directly. However, proposed deep learning methods for estimating the surface normal vectors of a point cloud have been for dense point clouds, and may not be suitable for sparse point clouds generated by a DAR sensor.

In many robotics and automotive applications, real-time performance is desired. Real-time or near real-time computation of surface normal vectors for a point cloud may be challenging for point clouds generated by existing and future DAR sensors. For example, existing LIDAR sensors may be capable of generating frames (each frame being a point cloud) at a frequency of 10 Hz (i.e., one point cloud per 100 ms), with over 100,000 data points per point cloud. Thus, a computationally efficient method is desired.

The present disclosure describes methods and systems for computing an estimated surface normal vector of a point cloud, including a sparse point cloud (e.g., generated by a LIDAR sensor, radar sensor or other DAR sensor). Examples disclosed herein include projecting a sparse 3D point cloud into a 2D range map and processing the 2D range map to compute an estimated surface normal vector, which is faster than processing the sparse 3D point cloud to estimate the surface normal.

Figure 4:
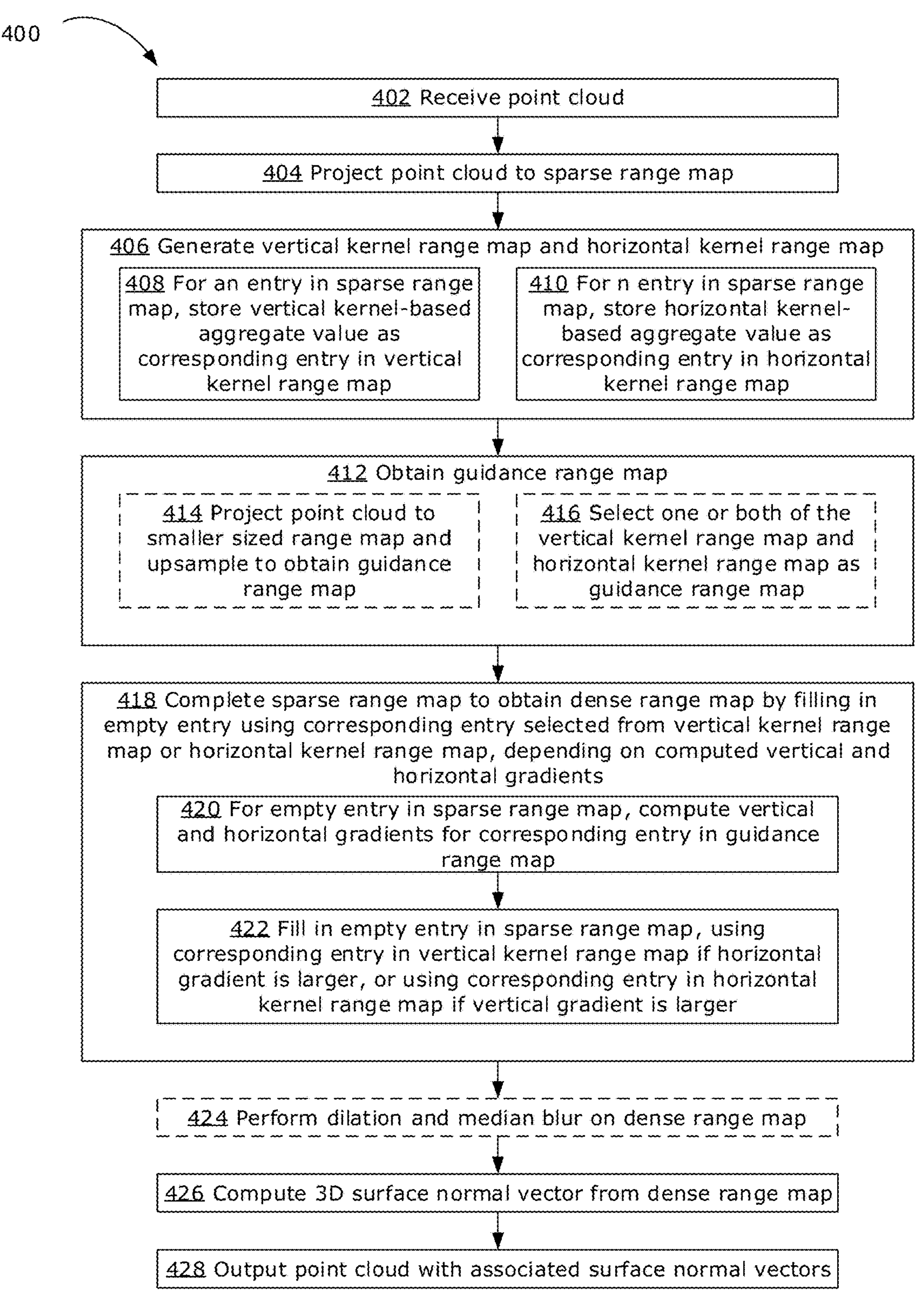
FIG. 4 is a flowchart of an example method for computing a surface normal vector for a point cloud, in accordance with examples of the present disclosure.

FIG. 4 is a flowchart illustrating an example method 400 for computing an estimated surface normal vector for a point cloud. The method 400 may be performed by a computing system (e.g., the computing system 100 of FIG. 1), for example by a processing unit of the computing system executing instructions. In some examples, the method 400 may be performed by a vehicle or mobile robot (e.g., the vehicle 200 of FIG. 2), which may include a processing unit and memory storing executable instructions (e.g., the vehicle or mobile robot may include or may be a computing system).

At 402, a point cloud is received. For example, a point cloud may be generated by a LIDAR sensor 214 of a vehicle 200, or may be generated by any other DAR sensor. As previously noted, the point cloud generated by a LIDAR sensor 214 (or other DAR sensor) may be a sparse point cloud.

At 404, the point cloud is projected to a sparse range map. Each data point in the point cloud may include a (x, y, z) coordinate and may also include additional information such as intensity. For the purpose of the method 400, only the (x, y, z) information for each data point needs to be considered.

Projection of the point cloud may be performed using any suitable technique, such as spherical transformation. For example, using spherical transformation, the elevation angle (denoted $\varphi$) and the azimuth angle (denoted $\theta$) that are used in the spherical frame of reference (i.e., frame of reference of the point cloud) are discretized to the index (u, v). Specifically, the azimuth angle $\theta$ is discretized along the horizontal index (u) and the elevation angle $\varphi$ is discretized along the vertical index (v). The result is a sparse range map (denoted r) having dimensions (H, W). Using typical spherical projection techniques, the vertical dimension (H) is usually two times the number of horizontal scanning lines performed by the sensor, and the horizontal dimension (W) is usually equal to the number of data points obtained along each horizontal scan.

If multiple data points of the point cloud are projected to the same index (u, v) in the sparse range map r, this may be resolved in various ways. For example, the data point among the multiple points that has the closest range may be used as the entry at index (u, v). Closest range refers to the data point that is the closest to the sensor (e.g., LIDAR sensor) that was used to obtain the point cloud. Depth or range refers to the Euclidean distance of the particular data point to the sensor. Generally, if the sparse range map has a high resolution, the occurrence of multiple data points being projected to the same index should be low, since the point cloud is expected to be sparse.

It should be understood that the result of the projection is a sparse range map, meaning that there are entries that have no value. An empty entry in the sparse range map is an entry at an index (u, v) where none of the data points in the point cloud project to that index. In order to compute more accurate estimations of the surface normal vectors, the sparse range map should be completed (i.e., the empty entries should be filled in with appropriate value).

At 406, a vertical kernel range map and a horizontal kernel range map are generated from the sparse range map. As will be discussed further below, the vertical kernel range map and horizontal kernel range map will be used to help complete the sparse range map, in order to obtain a dense range map from which surface normal vectors may be computed. Performing step 406 may include performing steps 408 and 410. Steps 408 and 410 may be performed in any order, and may be performed in parallel or in series.

At 408, for at least one entry in the sparse range map (e.g., for empty entries in the sparse range map, or for every entry in the sparse range map), a vertical kernel-based aggregate value is stored as a corresponding entry in the vertical kernel range map (denoted $r_{col}$). A vertical kernel is a kernel that defines the vertical neighbors of a given entry in the sparse range map. For example, the vertical kernel may define the vertical neighbors of a given entry to be the two entries above and the two entries below the given entry. That is, if the given entry is at index (i, j), then the vertical kernel defines the vertical neighbors to be the entries at (i, j+2), (i, j+1), (i, j−1) and (i, j−2). The aggregate value may be computed by aggregating the values from the vertical neighbors in any suitable manner. For example, the aggregate value may be computed by averaging the values of the vertical neighbors and the given entry. In another example, the aggregate value may be computed by applying a weight to the value at each neighbor, where the weight applied is dependent on the relative position of the neighbor to the given entry such that neighbors that are further away have lower weight. For example, Gaussian weights may be used (e.g., where the value at the given entry is assigned a weight of 1 and weights decrease with distance of the neighbor from the given entry). In some examples, if the vertical kernel extends outside the boundary of the sparse range map, the vertical neighbors may include empty neighbors. Such empty neighbors may be excluded from computation of the weighted average.

Figure 5:
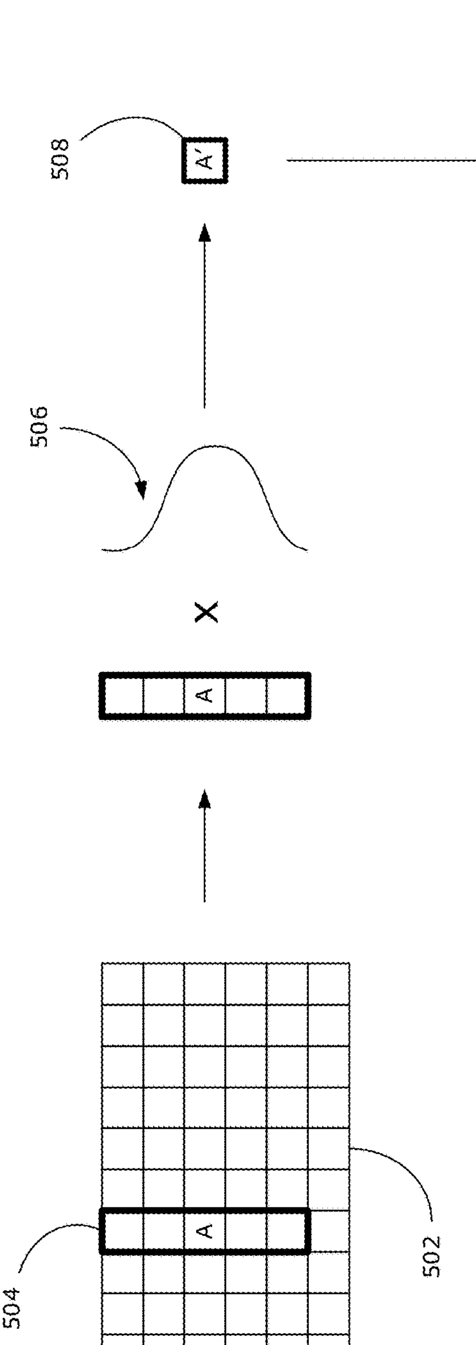
FIG. 5 illustrates an example of how an entry in a vertical kernel range map may be computed.
Figure 5:
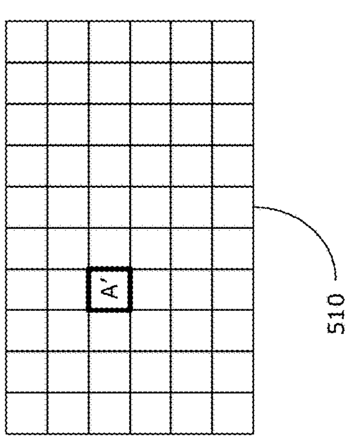

FIG. 5 illustrates a simplified example of how an entry in the vertical kernel range map may be computed and stored.

FIG. 5 illustrates a simple sparse range map 502. Consider an arbitrary given entry A in the sparse range map 502, at an arbitrary index such as (3, 2) (note that index values start at zero in this example). A vertical kernel 504, indicated by thick outline, defines the vertical neighbors of the given entry A. Gaussian weights 506 are applied to the vertical neighbors and the weighted aggregate 508 is denoted A'. The aggregate A' is then stored in the vertical kernel range map 510 at the index (3, 2) corresponding to the given entry A. This process is repeated for every entry of the sparse range map 502 to obtain the vertical kernel range map 510. It may be noted that the vertical kernel range map 510 has dimensions equal to that of the sparse range map 502, and every entry in the sparse range map 508 (even entries that are empty) has a corresponding entry in the vertical kernel range map 510.

Reference is again made to FIG. 4. At 410, for at least one entry in the sparse range map (e.g., for empty entries in the sparse range map, or for every entry in the sparse range map), a horizontal kernel-based aggregate value is stored as a corresponding entry in the horizontal kernel range map (denoted $r_{row}$). A horizontal kernel is a kernel that defines the horizontal neighbors of a given entry in the sparse range map. The horizontal kernel may or may not be the same size as the vertical kernel. The horizontal kernel is used to define the horizontal neighbors that are used to compute the aggregate value (e.g., using Gaussian weights), and the horizontal kernel-based aggregate value computed for each given entry in the sparse range map is stored as a corresponding entry in the horizontal kernel range map, similar to the manner described above for the vertical kernel range map.

After step 406 has been completed, two range maps have been generated, namely the vertical kernel range map $r_{col}$ generated using step 408 and the horizontal kernel range map $r_{row}$ generated using step 410. It should be understood that the vertical kernel used to generate the vertical kernel range map $r_{col}$ and the horizontal kernel used to generate the horizontal kernel range map $r_{row}$ may have any suitable size. The vertical kernel range map $r_{col}$ and the horizontal kernel range map $r_{row}$ are both equal to the sparse range map in dimension. If an arbitrary entry in the sparse range map is denoted r[i, j], then every entry r[i, j] in the sparse range map has a corresponding entry $r_{col}$[i, j] in the vertical kernel range map $r_{col}$ and also a corresponding entry $r_{row}$[i, j] in the horizontal kernel range map $r_{row}$.

In some examples, instead of computing all entries of the vertical kernel range map and all entries of the horizontal kernel range map, it may be sufficient to compute sparse vertical and horizontal kernel range maps. Specifically, it may be sufficient to compute entries in the vertical and horizontal kernel range maps corresponding to empty entries on the sparse range map. That is, an entry $r_{col}[i, j]$ in the vertical kernel range map $r_{col}$ and a corresponding entry $r_{row}[i, j]$ in the horizontal kernel range map $r_{row}$ may only need to be computed to correspond to an empty entry r[i, j] in the sparse range map. If an entry r[m, n] in the sparse range map is not empty (i.e., contains a value), then the corresponding entries $r_{col}[m, n]$ and $r_{row}[m, n]$ may not be computed and may remain empty in the vertical kernel range map and horizontal kernel range map, respectively.

At 412, a guidance range map is obtained. The guidance range map is a smoothed approximation of the sparse range map, which may be used to compute gradients (discussed further below). Step 412 may be performed in various ways to obtain the guidance range map. For example, step 412 may be performed using step 414 or using step 416.

If step 414 is performed, the point cloud (received at step 402) is projected again to a smaller sized range map having dimensions smaller than the sparse range map (e.g., projected to a range map that is only half the size of the sparse range map obtained at step 404). The smaller sized range map is then upsampled, to obtain a guidance range map having dimensions equal to the dimensions of the sparse range map. The guidance range map is thus a smoother but less detailed approximation of the sparse range map. This projection may be performed using a spherical projection technique similar to that described with respect to step 404, but with the elevation angle φ and the azimuth angle θ discretized to a smaller range of values. For example, the point cloud may be projected to a smaller range map having dimension (H/2, W/2) (compared to the sparse range map having dimension (H, W) obtained at step 404).

The smaller sized range map may then be upsampled (e.g., using bilinear upsampling) to obtain a guidance range map of dimension (H, W). By projecting the point cloud to a smaller sized range map then upsampling back to the same dimensions as the sparse range map, the result is a guidance range map that is a lower resolution smooth approximation of the sparse range map. The smoothness of the guidance range map enables gradients to be computed, however there is loss of detailed information.

Alternatively, if step 416 is performed, the vertical kernel range map, the horizontal kernel range map, or both, may be selected to be used as the guidance range map. The vertical kernel range map, the horizontal kernel range map, or both may be selected as the guidance range map only if all entries of the vertical and/or horizontal kernel range maps were computed at step 406. That is, the vertical kernel range map and/or horizontal kernel range map may be used as the guidance range map only if they are complete and not sparse. Since the vertical kernel range map and the horizontal kernel range map are generated by aggregating neighbor information, the vertical kernel range map and the horizontal kernel range map are expected to be relatively smooth (compared to the sparse range map) and thus enable computation of gradients. If both the vertical kernel range map and the horizontal kernel range map are selected as guidance range maps, the vertical gradient may be computed using the vertical kernel range map and the horizontal gradient may be computed using the horizontal kernel range map, as discussed further below.

Performing step 412 using step 414 may provide higher accuracy, but introduces additional computations. Performing step 412 using step 416 may avoid the need for additional computations (which may help to speed up the method 400, to enable computation of surface normal vectors in real-time), but may be less accurate. Step 414 or step 416 may be used as appropriate, depending on the specific application. Regardless of how step 412 is performed, it should be noted that every entry in the sparse range map has a corresponding entry in the guidance range map.

At 418, the sparse range map is completed to obtain a dense range map. This completion is performed by filling in an empty entry of the sparse range map using a corresponding entry selected from either the vertical kernel range map or the horizontal kernel range map, depending on vertical and horizontal gradients computed using the guidance range map. Step 418 may be performed using steps 420 and 422.

At 420, for a given empty entry in the sparse range map r, vertical and horizontal gradients are computed for a corresponding entry in the guidance range map (denoted $r_d$). That is, if the given empty entry in the sparse range map is r[i, j] (i.e., at index (i, j)), then the vertical and horizontal gradients are computed for the entry $r_d[i, j]$.

A vertical gradient is computed by computing the gradient along a column of the guidance range map, and a horizontal gradient is computed by computing the gradient along a row of the guidance range map. It should be noted that, since the azimuth angle θ is discretized along the horizontal index and the elevation angle φ is discretized along the vertical index, the horizontal gradient represents the azimuthal gradient $$\left(\text{denoted}\, \frac{\partial r_d}{\partial \theta}\right)$$

and the vertical gradient represents the elevation gradient $$\left(\text{denoted}\, \frac{\partial r_d}{\partial \varphi}\right).$$

Various techniques may be used to compute the vertical and horizontal gradients, for example using finite differences.

If the guidance range map is obtained by projecting the point cloud to a smaller sized range map and then upsampling, the vertical and horizontal gradients may be computed for the corresponding entry in the upsampled range map.

If the guidance range map is obtained by selecting the vertical kernel range map as the guidance range map, the vertical and horizontal gradients may be computed for the corresponding entry in the vertical kernel range map.

If the guidance range map is obtained by selecting the horizontal kernel range map as the guidance range map, the vertical and horizontal gradients may be computed for the corresponding entry in the horizontal kernel range map.

If the guidance range map is obtained by selecting both the vertical kernel range map and the horizontal kernel range map as guidance range maps, the vertical gradient may be computed for the corresponding entry in the vertical kernel range map and the horizontal gradient may be computed for the corresponding entry in the horizontal kernel range map.

Regardless of whether the guidance range map is the upsampled range map, the vertical kernel range map, the horizontal kernel range map, or both vertical and horizontal kernel range maps, the result of step 420 is that a vertical gradient $$\frac{\partial r_d[i, j]}{\partial \varphi}$$

and a horizontal gradient $$\frac{\partial r_d[i,j]}{\partial \theta}$$

are computed, corresponding to the index (i, j) of the empty entry.

In some examples, the vertical and horizontal gradients may be computed for every entry in the sparse range map, regardless of whether the entry is empty or not.

At 422, the given empty entry in sparse range map is filled using the corresponding entry in vertical kernel range map if the horizontal gradient is larger, or using the corresponding entry in horizontal kernel range map if the vertical gradient is larger. That is, for the given empty entry at index (i, j) in the sparse range map, the computed vertical and horizontal gradients that have been computed for the corresponding point in the guidance range map are compared. Then, if the horizontal gradient is larger than the vertical gradient $$\left(\text{i.e., } \frac{\partial r_d[i,j]}{\partial \theta[i,j]} > \frac{\partial r_d[i,j]}{\partial \varphi[i,j]}\right),$$

the given empty entry is filled in using the corresponding entry in the vertical kernel range map (i.e., $r[i, j] \leftarrow r_{col}[i, j]$) This is because the larger horizontal gradient indicates that the change in the vertical direction is small and thus the surface at this location is likely a vertical surface. Conversely, if the vertical gradient is larger than the horizontal gradient $$\left(\text{i.e., } \frac{\partial r_d[i,j]}{\partial \theta[i,j]} < \frac{\partial r_d[i,j]}{\partial \varphi[i,j]}\right),$$

the given empty entry is filled in using the corresponding entry in the horizontal kernel range map (i.e., $r[i, j] \leftarrow r_{row}[i, j]$). This is because the larger vertical gradient indicates that the change in the horizontal direction is small and thus the surface at this location is likely a horizontal surface.

If the horizontal gradient and the vertical gradient are equal or approximately equal (e.g., differ by less than 5%), then the surface at this location is likely a vertical surface and the empty entry should be filled in using the corresponding entry in the vertical kernel range map (i.e., $r[i, j] \leftarrow r_{col}[i, j]$).

Steps 420 and 422 may be repeated for every entry in the sparse range map that is empty. In this way, the sparse range map is completed to obtain a dense range map.

Optionally, at 426, dilation (e.g., using a cross kernel) and/or median blur may be performed on the dense range map. This may be performed to smooth out any edges, and may also help to fill in any remaining missing entries. For example, if there is a large empty space in the sparse range map, filling entries within the empty space using the vertical and horizontal kernel range maps may not be sufficient. The dilation and/or blurring operation may help to fill in any such large empty portions of the sparse range map, to help ensure that the dense range map is complete.

At 428, a 3D surface normal vector is computed from the dense range map. A 2D to 3D normal transformation computation may be performed, to transform from the 2D frame of reference of the dense range map to the 3D frame of reference of the point cloud.

This computation may be performed using geometry calculations, such as the following:

$$\begin{bmatrix} n_x \\ n_y \\ n_z \end{bmatrix}_{[i,j]} = \begin{bmatrix} \cos\theta & -\sin\theta & 0 \\ \sin\theta & \cos\theta & 0 \\ 0 & 0 & 1 \end{bmatrix}_{[i,j]} \begin{bmatrix} \cos\varphi & 0 & -\sin\varphi \\ 0 & 1 & 0 \\ \sin\varphi & 0 & \cos\varphi \end{bmatrix}_{[i,j]} \begin{bmatrix} 1 \\ \frac{1}{r\cos\varphi}\frac{\partial r}{\partial \theta} \\ \frac{1}{r}\frac{\partial r}{\partial \varphi} \end{bmatrix}_{[i,j]}$$

where $n_x$, $n_y$ and $n_z$ are the x, y and z-components, respectively, of the computed surface normal vector. This computation may be performed for every (i, j) entry in the dense range map to compute the surface normal vectors.

At 430, the point cloud with associated surface normal vectors (computed at step 428) is outputted. Each data point in the point cloud may be associated with a respective surface normal vector computed using the transformation described above.

The surface normal vectors and point cloud may be outputted to be further processed, for example to perform additional perception tasks such as object detection and segmentation. In general, the method 400 may be implemented in any computing system for preprocessing of a point cloud, without being limited to particular applications.

It should be noted that some steps of the method 400 may be performed in parallel or in a different order than that shown in FIG. 4. For example, steps 406 and 412 may be performed in any order and may be performed in parallel.

In some examples, the method 400 or a portion of the method 400 may be performed to output a dense range map instead of or in addition to the point cloud with associated surface normal vectors. For example, the method 400 may be modified to include a step of outputting the dense range map following step 418 or following optional step 424. Such a step of outputting the dense range map may be performed in place of or in addition to steps 426 and 428. In some examples, the method 400 may start with receiving the sparse range map, instead of receiving the point cloud and projecting the point cloud to obtain the sparse range map (i.e., a step of receiving the sparse range map may replace steps 402 and 404). Thus, in some examples, the method 400 may be used as a depth completion method that receives a sparse range map and outputs a dense range map. This may be useful in applications where perception tasks (or other machine tasks) are performed using dense range maps as input.

Figure 6:
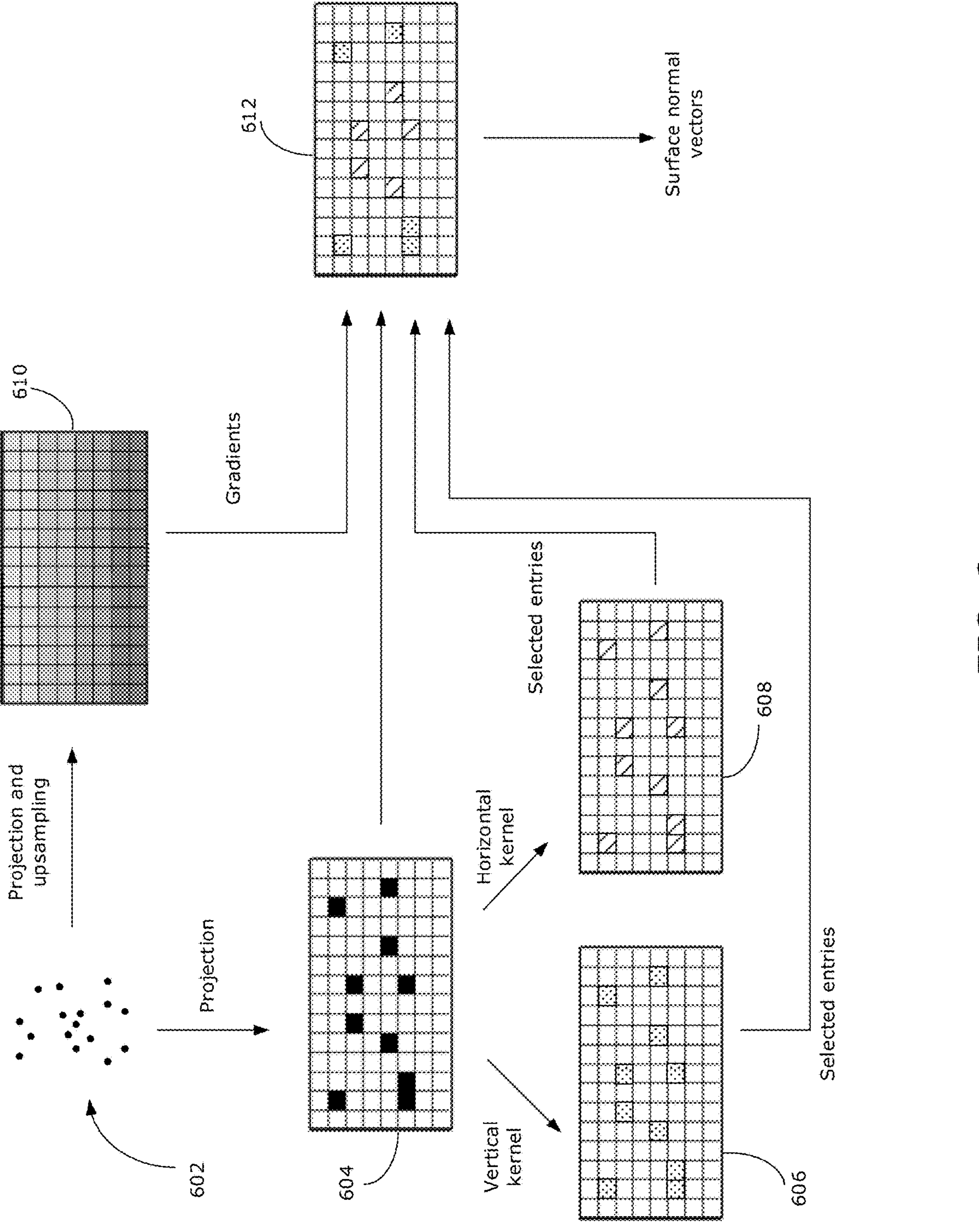
FIG. 6 illustrates an example implementation of the method of FIG. 4.

FIG. 6 is a schematic diagram illustrating a simplified example implementation of the method 400.

A point cloud 602 is received. The point cloud 602 is projected to a sparse range map 604 (e.g., corresponding to step 404 of the method 400). In the sparse range map 604, empty entries are represented by black blocks. Using a vertical kernel, a vertical kernel range map 606 is generated (e.g., corresponding to step 408 of the method 400). A first type of shading (dots) is used to indicate that the vertical kernel range map 606 contains entries corresponding to the missing entries of the sparse range map 604. Using a horizontal kernel, a horizontal kernel range map 608 is generated (e.g., corresponding to step 410 of the method 400). A second type of shading (diagonal stripes) is used to indicate that the horizontal kernel range map 608 contains entries corresponding to the missing entries of the sparse range map 604. The vertical kernel range map 606 and the horizontal kernel range map 608 may be generated in any order, and may be generated in parallel.

Prior to, during, or following generation of the vertical and horizontal kernel range maps 606, 608, the point cloud 602 may be projected to a smaller sized range map and then upsampled, to obtain the guidance range map 610 (e.g., corresponding to step 414 of the method 400). In FIG. 6, the guidance range map 610 is colored in greyscale to indicate that the guidance range map 610 is smoothed out.

Then, using the vertical and horizontal gradients computed from the guidance range map 610, entries are selected from the vertical kernel range map 606 or the horizontal kernel range map 608 to fill in the empty entries of the sparse range map 604 (e.g., corresponding to step 418 of the method 400). The result is a dense range map 612. The dense range map 612 contains some entries that have been completed using entries selected from the vertical kernel range map 606 as indicated by the first type of shading (dots), and other entries that have been completed using entries selected from the horizontal kernel range map 608 as indicated by the second type of shading (diagonal stripes).

The dense range map 612 may then be used to compute the surface normal vectors for the point cloud 602 (e.g., corresponding to step 426 of the method 400).

In various examples, the present disclosure has described methods and systems that enable surface normal vectors to be computed using a deterministic computation for every data point in a point cloud. Compared to some existing techniques that require neural networks to estimate surface normal vectors, the examples disclosed herein have computational complexity which may help to enable real-time or near real-time computation of surface normal vectors. This may enable better performance of downstream perception tasks (e.g., as typically performed by autonomous vehicles and mobile robots). Further, such a deterministic approach may enable examples of the present disclosure to be implemented in a variety of computing systems, including computing systems with limited processing power and/or limited memory resources (e.g., smaller mobile robots, such as robotic vacuums).

The use of vertical and horizontal gradients as a basis for selecting an entry (from different possible options) to fill an empty entry in the sparse range map may result in more accurate depth completion. For example, an autonomous vehicle driving in a mostly human-made environment would encounter objects that are mostly vertical (e.g., buildings, poles, etc.) or horizontal (e.g., street, sidewalk, etc.). By enabling selection between an entry generated using a vertical kernel or an entry generated using a horizontal kernel, the depth completion may be more accurate. It should be noted that although the present disclosure uses vertical and horizontal kernels, and vertical and horizontal gradients, these are not intended to be limiting. The use of different kernels (e.g., diagonal kernels) to define neighbors, and the computation of gradients in a corresponding direction (e.g., diagonal gradients) may be encompassed by the present disclosure.

Examples of the present disclosure also provide a depth completion process may be used to generate a dense range map from sparse range measurements (e.g., resulting from a sparse point cloud).

Although examples have been described in the context of autonomous vehicles, methods and systems disclosed herein may be useful in other domains such as monitoring systems, imaging systems or scanning systems where a sparse point cloud may be generated as sensor data.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computing system comprising:

a processing unit configured to execute instructions to cause the computing system to:

receive a point cloud;

project the point cloud to a sparse range map;

generate, from the sparse range map, a vertical kernel range map using a vertical kernel and a horizontal kernel range map using a horizontal kernel;

obtain a guidance range map that is a smoothed approximation of the sparse range map;

complete the sparse range map to obtain a dense range map by:

for a given empty entry in the sparse range map, computing a vertical gradient and a horizontal gradient using the guidance range map for a corresponding entry in the guidance range map; and filling in the given empty entry using a corresponding entry in the vertical kernel range map or in the horizontal kernel range map, based on a comparison between the vertical gradient and the horizontal gradient;

compute a surface normal vector using the dense range map; and output the point cloud associated with the surface normal vector.

2. The computing system of claim 1, wherein the processing unit is further configured to execute instructions to cause the computing system to generate the vertical kernel range map by:

for at least one entry in the sparse range map, define a set of vertical neighbors using a vertical kernel;

compute a vertical kernel-based aggregate value from the set of vertical neighbors; and store the vertical kernel-based aggregate value as a corresponding entry in the vertical kernel range map;

wherein the processing unit is further configured to execute instructions to cause the computing system to generate the horizontal kernel range map by:

for at least one entry in the sparse range map, define a set of horizontal neighbors using a horizontal kernel;

compute a horizontal kernel-based aggregate value from the set of horizontal neighbors; and store the horizontal kernel-based aggregate value as a corresponding entry in the horizontal kernel range map.

3. The computing system of claim 2, wherein the vertical kernel range map is generated to have entries corresponding to every entry in the sparse range map, and wherein the horizontal kernel range map is generated to have entries corresponding to every entry in the sparse range map.

4. The computing system of claim 2, wherein the vertical kernel range map is generated to have entries corresponding to empty entries in the sparse range map, and wherein the horizontal kernel range map is generated to have entries corresponding to empty entries in the sparse range map.

5. The computing system of claim 1, wherein the processing unit is further configured to execute instructions to cause the computing system to obtain the guidance range map by:

projecting the point cloud to a smaller sized range map having dimensions smaller than the sparse range map; and upsampling the smaller sized range map to obtain the guidance range map having dimensions equal to the sparse range map.

6. The computing system of claim 1, wherein the processing unit is further configured to execute instructions to cause the computing system to obtain the guidance range map by:

selecting at least one of the vertical kernel range map or the horizontal kernel range map to use as the guidance range map.

7. The computing system of claim 1, wherein filling in the given empty entry using a corresponding entry in the vertical kernel range map or in the horizontal kernel range map comprises:

selecting the corresponding entry in the vertical kernel range map when the horizontal gradient is greater than the vertical gradient; and selecting the corresponding entry in the horizontal kernel range map when the vertical gradient is greater than the horizontal gradient.

8. The computing system of claim 1, wherein the processing unit is further configured to execute instructions to cause the computing system to output the dense range map.

9. The computing system of claim 1, wherein the processing unit is further configured to execute instructions to cause the computing system to:

prior to computing the surface normal vector, perform at least one of dilation or median blur on the dense range map;

wherein the surface normal vector is computed from the dense range map after the at least one of the dilation or median blur.

10. The computing system of claim 1, wherein the computing system is implemented in an autonomous vehicle.

11. A method comprising:

receiving a point cloud;

projecting the point cloud to a sparse range map;

generating, from the sparse range map, a vertical kernel range map using a vertical kernel and a horizontal kernel range map using a horizontal kernel;

obtaining a guidance range map that is a smoothed approximation of the sparse range map;

completing the sparse range map to obtain a dense range map by:

for a given empty entry in the sparse range map, computing a vertical gradient and a horizontal gradient using the guidance range map for a corresponding entry in the guidance range map; and filling in the given empty entry using a corresponding entry in the vertical kernel range map or in the horizontal kernel range map, based on a comparison between the vertical gradient and the horizontal gradient;

computing a surface normal vector using the dense range map; and outputting the point cloud associated with the surface normal vector.

12. The method of claim 11, wherein generating the vertical kernel range map comprises:

for at least one entry in the sparse range map, defining a set of vertical neighbors using a vertical kernel;

computing a vertical kernel-based aggregate value from the set of vertical neighbors; and storing the vertical kernel-based aggregate value as a corresponding entry in the vertical kernel range map;

wherein generating the horizontal kernel range map comprises:

for at least one entry in the sparse range map, defining a set of horizontal neighbors using a horizontal kernel;

computing a horizontal kernel-based aggregate value from the set of horizontal neighbors; and storing the horizontal kernel-based aggregate value as a corresponding entry in the horizontal kernel range map.

13. The method of claim 12, wherein the vertical kernel range map is generated to have entries corresponding to every entry in the sparse range map, and wherein the horizontal kernel range map is generated to have entries corresponding to every entry in the sparse range map.

14. The method of claim 12, wherein the vertical kernel range map is generated to have entries corresponding to empty entries in the sparse range map, and wherein the horizontal kernel range map is generated to have entries corresponding to empty entries in the sparse range map.

15. The method of claim 11, wherein obtaining the guidance range map comprises:

projecting the point cloud to a smaller sized range map having dimensions smaller than the sparse range map; and upsampling the smaller sized range map to obtain the guidance range map having dimensions equal to the sparse range map.

16. The method of claim 11, wherein obtaining the guidance range map comprises:

selecting at least one of the vertical kernel range map or the horizontal kernel range map to use as the guidance range map.

17. The method of claim 11, wherein filling in the given empty entry using a corresponding entry in the vertical kernel range map or in the horizontal kernel range map comprises:

selecting the corresponding entry in the vertical kernel range map when the horizontal gradient is greater than the vertical gradient; and selecting the corresponding entry in the horizontal kernel range map when the vertical gradient is greater than the horizontal gradient.

18. The method of claim 11, further comprising outputting the dense range map.

19. The method of claim 11, further comprising:

prior to computing the surface normal vector, performing at least one of dilation or median blur on the dense range map;

wherein the surface normal vector is computed from the dense range map after the at least one of the dilation or median blur.

20. A non-transitory computer readable medium having instructions encoded thereon, wherein the instructions are executable by a processing unit of a computing system to cause the computing system to:

receive a point cloud;

project the point cloud to a sparse range map;

generate, from the sparse range map, a vertical kernel range map using a vertical kernel and a horizontal kernel range map using a horizontal kernel;

obtain a guidance range map that is a smoothed approximation of the sparse range map;

complete the sparse range map to obtain a dense range map by:

for a given empty entry in the sparse range map, computing a vertical gradient and a horizontal gradient using the guidance range map for a corresponding entry in the guidance range map; and filling in the given empty entry using a corresponding entry in the vertical kernel range map or in the horizontal kernel range map, based on a comparison between the vertical gradient and the horizontal gradient;

compute a surface normal vector using the dense range map; and output the point cloud associated with the surface normal vector.

* * * * *